(12) United States Patent  (10) Patent No.: US 7,814,292 B2
Tsien                      (45) Date of Patent:      Oct. 12, 2010

(54) MEMORY ATTRIBUTE SPECULATION

(75) Inventor: Benjamin Tsien, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 11/153,036

(22) Filed: Jun. 14, 2005

(65) Prior Publication Data

US 2006/0282645 A1 Dec. 14, 2006

(51) Int. Cl.
  G06F 9/26 (2006.01)
  G06F 13/00 (2006.01)

(52) U.S. Cl. .................. 711/202; 711/141; 711/142; 711/143; 711/144; 711/145; 711/146; 711/200; 711/203; 711/205; 711/206; 711/207

(58) Field of Classification Search .............. 711/200, 711/202–203, 205–207, 141–146
  See application file for complete search history.

(56) References Cited

U.S. PATENT DOCUMENTS 6,006,312 A * 12/1999 Kohn et al. ............ 711/210
6,119,205 A * 9/2000 Wicki et al. ............ 711/143
6,430,657 B1 * 8/2002 Mittal et al. ............ 711/138
6,651,156 B1 * 11/2003 Courtright et al. ......... 711/207
6,826,670 B2 * 11/2004 Middleton et al. ......... 711/205
7,062,631 B1 * 6/2006 Klaiber et al. ............ 711/207
7,089,397 B1 * 8/2006 Anvin et al. ............. 711/207
2003/0018877 A1 * 1/2003 Gaskins et al. ............ 711/207
2003/0167292 A1 * 9/2003 Ross ..................... 709/101

* cited by examiner

*Primary Examiner*—Tuan V Thai
*Assistant Examiner*—Zhuo H Li
(74) *Attorney, Agent, or Firm*—Trop, Pruner & Hu, P.C.

(57) ABSTRACT

A technique to speculatively assign a memory attribute. More specifically, embodiments of the invention include an architecture to assign and issue a speculative memory attribute based on a plurality of translation look-aside buffer (TLB) page attributes concurrently with the determination of the correct memory attribute, such that, in at least one case, determination of the correct memory attribute does not impact performance of a system in which at least one embodiment of the invention is included.

26 Claims, 6 Drawing Sheets

MEMORY ATTRIBUTE SPECULATION

FIELD OF INVENTION

Generally, embodiments of the invention relate to integrated electronics and integrated electronics systems. More specifically, one embodiment of the invention relates to a technique to speculatively assign memory attributes to memory request operations based, at least in part, on a translation look-aside buffer (TLB) attribute of the memory request.

BACKGROUND

In a microprocessor or other electronics device within a computer system, various logic circuits, such as processing cores, may request data from other logic circuits within or outside of the microprocessor or computer system, which may be stored, at least temporarily, within the requesting logic circuit's cache memory for the logic circuit to use. Accordingly, requesting logic circuits and other electronic devices may be referred to as "cache agents".

Figure 1:
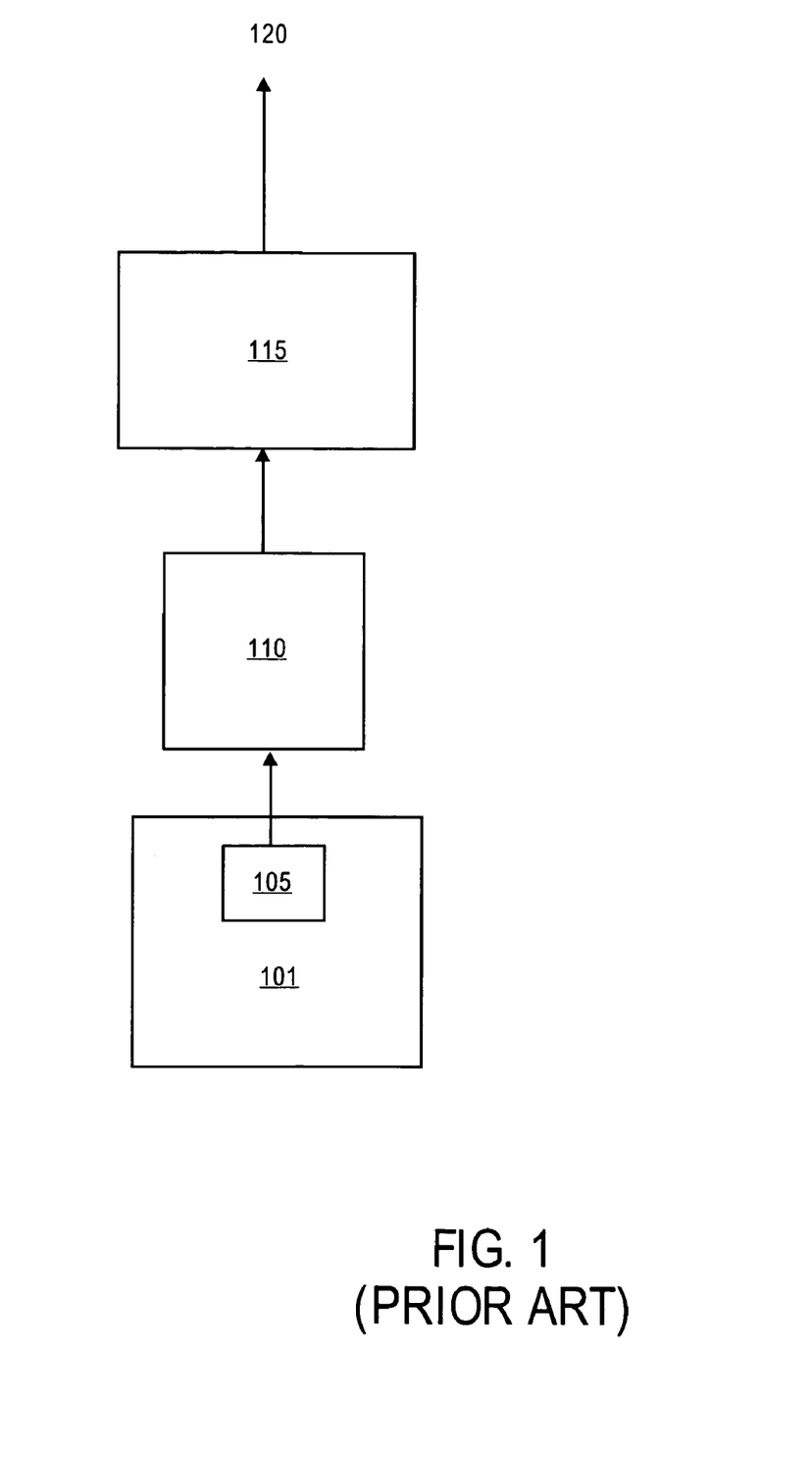
FIG. 1 illustrates a prior art portion of a memory access architecture.

FIG. 1 illustrates a prior art portion of an architecture for translating and carrying out a memory request from a cache agent to a memory or input/output (I/O) device located somewhere within the computer system. The processor agent 101 of FIG. 1 may initiate a memory access operation, such as a write or read operation, by generating a logical address. The logical address is subsequently translated into a physical address. Translation between a logical address and a physical one may be performed according to a table, programmed by an operating system (OS), the entries of which map logical addresses to corresponding physical addresses. One such table is sometimes referred to as a "page table". A "translation look-aside buffer" (TLB) 105 is a structure where page table entries are cached in the processor core where the translation occurs. Other translation mechanisms can also be used, including logic that takes a logical address and decodes a physical address according to some algorithm.

Each page table entry contains a physical address to which the logical address may be mapped. Furthermore, each entry may correspond to a group of physical addresses, such as a "page", the size of which can be defined by the particular computer or processor architecture. Associated with each page table entry held in the TLB illustrated in FIG. 1 is a page attribute, which defines how the particular page of memory to which the entry corresponds is to be accessed. For example, a page may have associated therewith a number of attributes, such as "write back" (WB), which indicates that programming accesses to corresponding portions of physical memory could be cached, "write coalescing" (WC), which indicates that programming accesses to corresponding portions of physical memory are non-temporal (i.e. do not need to be cached), and that multiple writes can be coalesced/combined into a single for optimization, and "uncacheable" (UC), meaning that data accessed from the corresponding portions of physical memory cannot be cached or coalesced. Other physical memory attributes may also exist within each page table entry.

TLB page attributes are typically assigned to each page of physical memory mapped within the TLB by the OS associated with the particular processor in which the TLB exists. Unfortunately, other system memory attributes may be defined by the firmware that may or may not exactly correspond one-to-one with the attributes defined by the OS. For example, address decoder 110 may assign a system memory attribute to each physical address based, at least in part, on the firmware of the particular computer system. Because these attributes exist in different levels of system abstraction, page attributes for the higher OS level, and the memory attribute on the lower firmware or system level, these attributes are aliased to one another in an allowable set of cross-products defined in the system architecture of the processor. For example, some physical memory pages may be deemed "coherent", meaning that accesses to that portion of memory may be only accessed according to a cache coherence protocol implemented through hardware within the processor or system, whereas other physical memory pages may be deemed "non-coherent", meaning that accesses to that portion of memory need not be made coherent through hardware, and that a programmer may or may not choose a software method to maintain coherency.

Therefore, the TLB page attributes for a particular address may be assigned to a memory attribute by the address decoder. In many cases, the memory attributes correspond well to the TLB page attributes. For example, typically the address decoder will assign a "coherent" memory attribute to a physical address having a WB page attribute and "non-coherent" memory attribute to physical addresses having a WC or UC page attribute, which may be compatible attribute assignments in many cases. In the not-so-typical case that a memory attribute is assigned to a physical address that is inconsistent with the TLB page attribute (e.g., a non-coherent memory attribute assigned to a physical address page corresponding to a WB page attribute), the access will have to be repeated and the memory attribute corrected in one embodiment.

Once the memory attribute has been determined for a physical address, the address and memory attribute may be passed to a source request in-flight table, such as a missing address file (MAF) 115. The MAF, among other things, may determine availability of resources to be accessed by the physical address. Furthermore, the MAF may be responsible for issuing the address to the target device on the interconnect 120 in accordance with a specific protocol, such as a cache coherency protocol.

Typically, the physical memory attributes assigned by the address decoder require access to a look-up table, which may require multiple processor cycles to complete, thereby delaying the completion of the memory access generated by the cache agent.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Embodiments of the invention disclosed herein describe a memory access technique that may be used in an electronic device, such as a single core or multiple core microprocessor, or an electronics system, such a shared bus computer system or a point-to-point (P2P) bus computer system. More particularly, one embodiment of the invention describes an architecture, in which a memory attribute or attributes associated with a particular memory access operation can be speculatively determined and later corrected if incorrectly speculated. Advantageously, at least one embodiment of the invention helps to improve performance of memory accesses by a cache agent, because of the relative number of correct memory attribute speculations in relation to the number of incorrect memory attribute speculations.

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the invention may be implemented in a variety of electronic devices and logic circuits. Furthermore, devices or circuits that include embodiments of the invention may be included within a variety of computer systems, including a point-to-point (p2p) computer system and shared bus computer systems. Embodiments of the invention may also be included in other computer system topologies and architectures.

Figure 2:
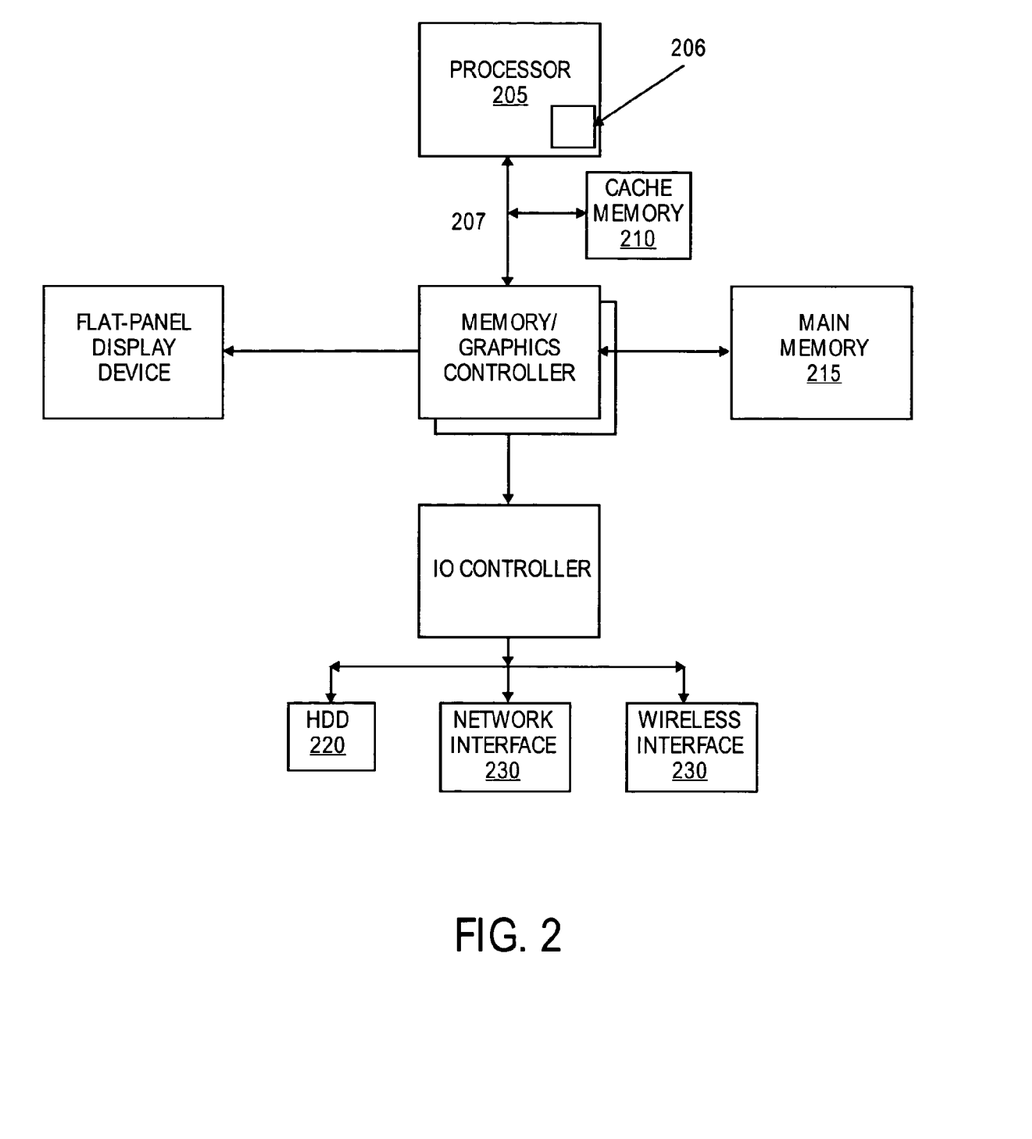
FIG. 2 illustrates a shared bus computer system in which one embodiment of the invention may be used.

FIG. 2, for example, illustrates a front-side-bus (FSB) computer system in which one embodiment of the invention may be used. A processor 205 accesses data from a level one (L1) cache memory 210 and main memory 215. In other embodiments of the invention, the cache memory may be a level two (L2) cache or other memory within a computer system memory hierarchy. Furthermore, in some embodiments, the computer system of FIG. 2 may contain both a L1 cache and an L2 cache.

Illustrated within the processor of FIG. 2 is one embodiment of the invention 206. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 220, or a memory source located remotely from the computer system via network interface 230 containing various storage devices and technologies. The cache memory may be located either within the processor or in close proximity to the processor, such as on the processor's local bus 207.

Furthermore, the cache memory may contain relatively fast memory cells, such as a six-transistor (6 T) cell, or other memory cell of approximately equal or faster access speed. The computer system of FIG. 2 may be a point-to-point (PtP) network of bus agents, such as microprocessors, that communicate via bus signals dedicated to each agent on the PtP network. Within, or at least associated with, each bus agent may be at least one embodiment of invention 206. Alternatively, an embodiment of the invention may be located or associated with only one of the bus agents of FIG. 2, or in fewer than all of the bus agents of FIG. 2.

Figure 3:
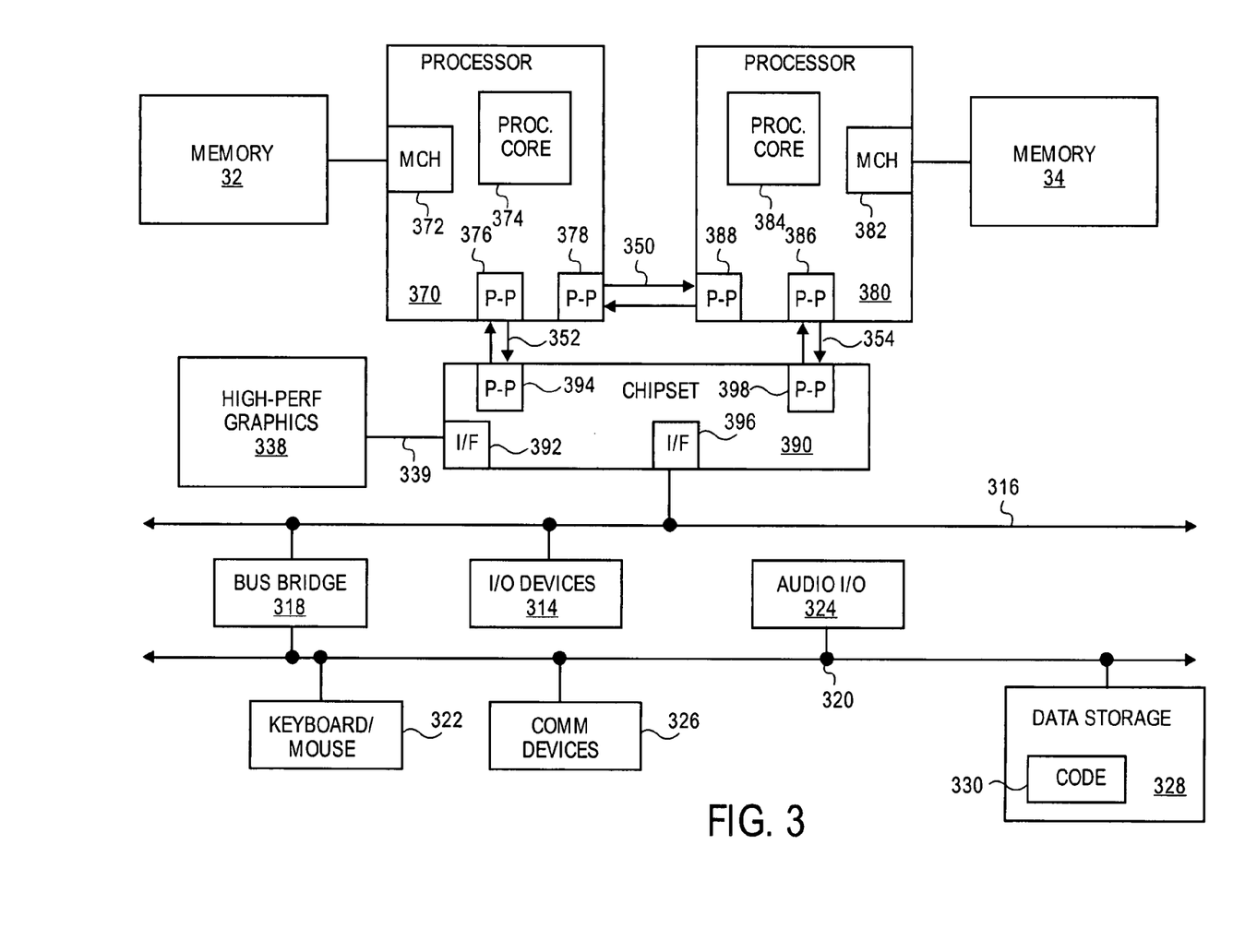
FIG. 3 illustrates a point-to-point computer system in which one embodiment of the invention may be used.

Similarly, at least one embodiment may be implemented within a point-to-point computer system. FIG. 3, for example, illustrates a computer system that is arranged in a point-to-point (PtP) configuration. In particular, FIG. 3 shows a system where processors, memory, and input/output devices are interconnected by a number of point-to-point interfaces.

The system of FIG. 3 may also include several processors, of which only two, processors 370, 380 are shown for clarity. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3.

Other embodiments of the invention, however, may exist in other circuits, logic units, or devices within the system of FIG. 3. Furthermore, in other embodiments of the invention may be distributed throughout several circuits, logic units, or devices illustrated in FIG. 3.

Figure 4:
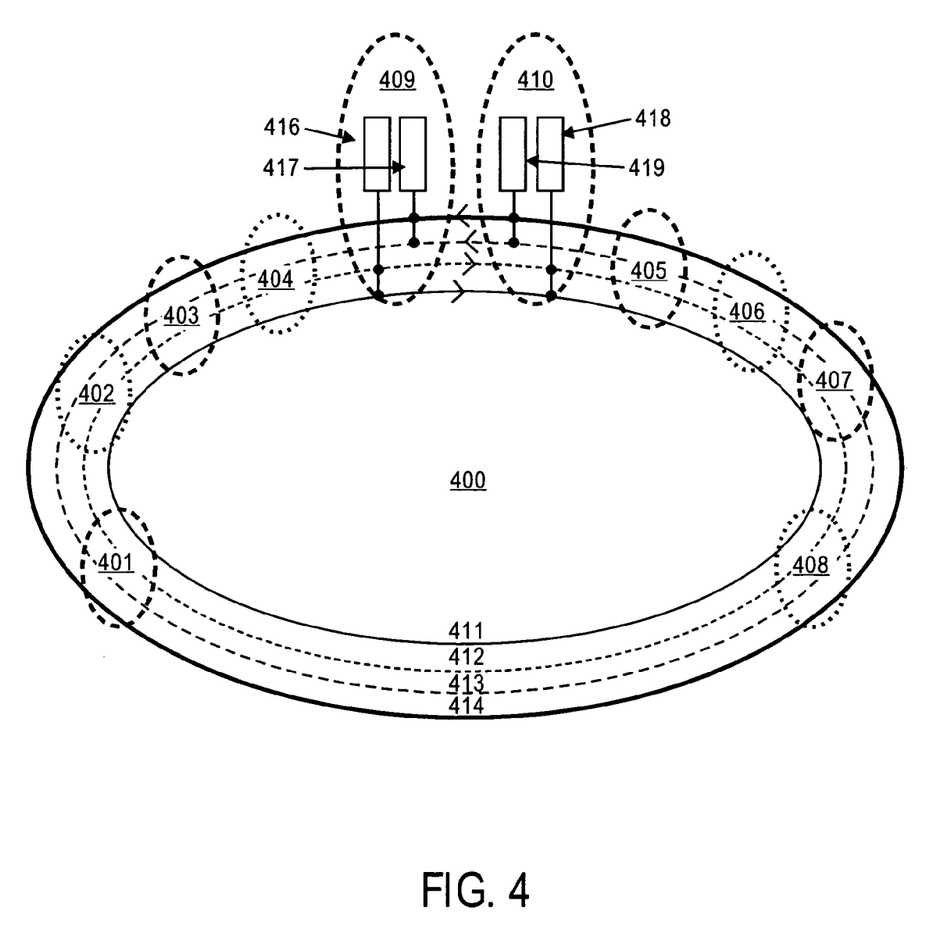
FIG. 4 illustrates a network of cache agents within a multi-core processor, in accordance with one embodiment of the invention.

Each device illustrated in FIGS. 2 and 3 may contain multiple cache agents, such as processor cores, that may access memory associated with other cache agents located within other devices within the computer system. FIG. 4, for example, illustrates a network of cache agents, such as processor cores, within one of the processors illustrated in FIG. 3. In particular, FIG. 4 illustrates a network of cache agents, such as processor cores, within a microprocessor, in which the cache agents may communicate via two bi-directional signals, an address signal and a non-address signal, which may be conceptualized as four uni-directional rings 411, 412, 413 and 414, two of which (411 and 412) are capable of transmitting information in a first direction and two of which (413 and 414) are capable of transmitting information in a second direction during odd and even clock cycles, respectively. The network 400 illustrated in FIG. 4 includes a first set of caching agents 401, 403, 405, and 407 that correspond to a first caching protocol agent ("protocol agent") 409 including interfaces 416 and 417 and a second set of caching agents 402, 404, 406, and 408 that correspond to a second protocol agent 410 including interfaces 418 and 419. In other embodiments of the invention, cache agents may be interconnected in other topologies.

For the sake of illustration, an embodiment of the invention is discussed below that may be implemented in a p2p computer system, such as the one illustrated in FIG. 3. Accordingly, numerous details specific to the operation and implementation of the p2p computer system of FIG. 3 will be discussed in order to provide an adequate understanding of at least one embodiment of the invention. However, other embodiments of the invention may be used in other computer system architectures and topologies, such as the shared-bus system of FIG. 2. Therefore, reference to the p2p computer system of FIG. 3 should not be interpreted as the only computer system environment in which embodiments of the invention may be used. The principals discussed herein with regard to a specific embodiment or embodiments are broadly applicable to a variety of computer system and processing architectures and topologies.

Figure 5:
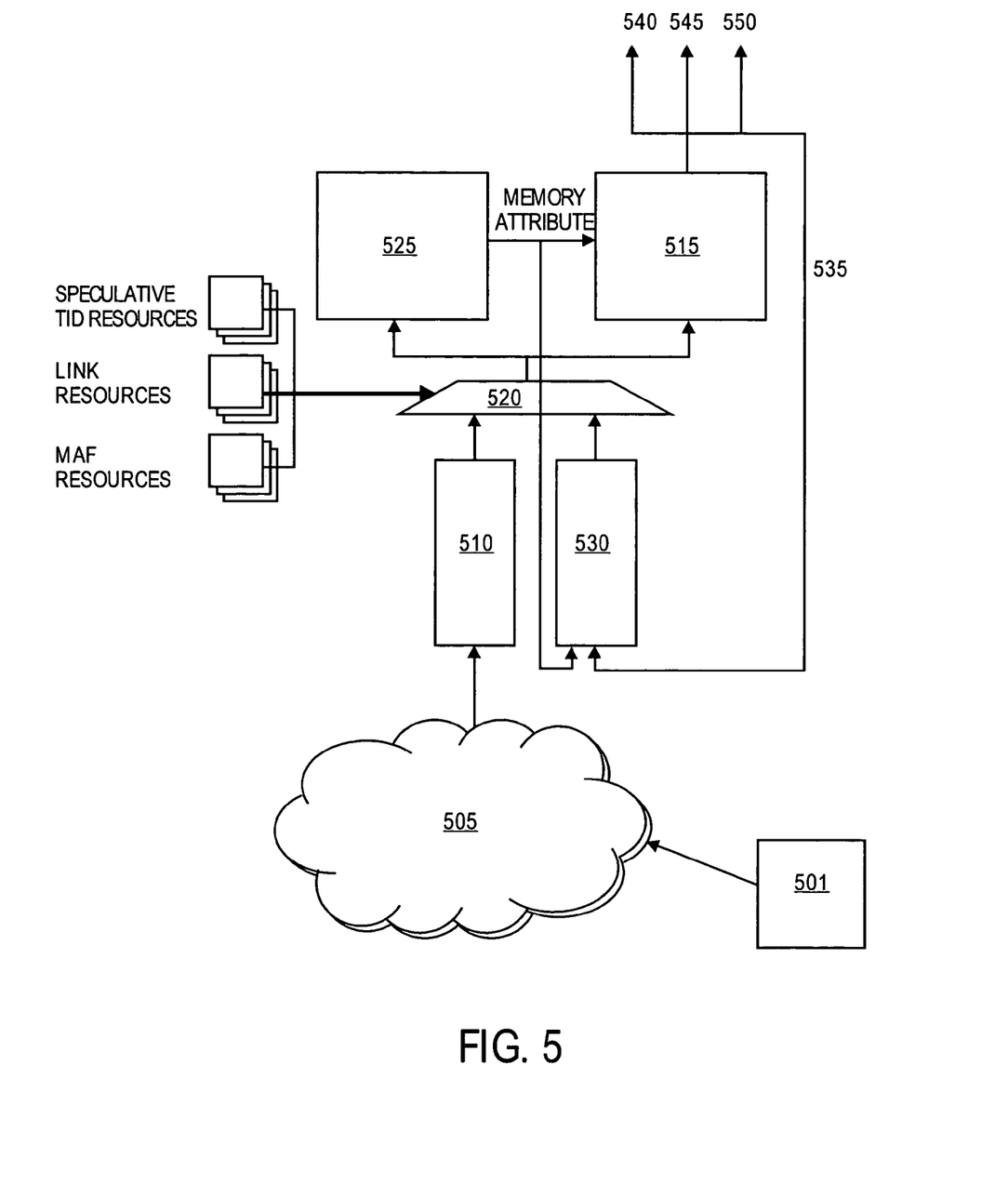
FIG. 5 illustrates a portion of a memory access architecture according to one embodiment of the invention.

FIG. 5 illustrates portions of a memory access architecture, according to one embodiment, in which cache agents, such as those illustrated in FIG. 4, may communicate with other cache agents located within other devices illustrated in the p2p computer system of FIG. 3. Generally, FIG. 5 illustrates one embodiment of the invention in which a memory attribute associated with a physical address from a cache agent may be speculatively chosen based off of the corresponding TLB page attribute associated with the TLB entry from which the physical address was determined. If the speculation of the memory attribute is incorrect, an embodiment of the invention includes a technique and associated logic to re-issue the physical address into the pipeline with the correct memory attribute.

Specifically, FIG. 5 includes a cache agent 501 that communicates with other cache agents within or outside of the same electronics device via a cache agent network 505. In one embodiment of the invention, the cache agent network is a network of processing cores within a microprocessor. In other embodiments, the cache agent network is a network of cache agents, which may include processing cores not within the same microprocessor or other electronics device. In one embodiment, memory accesses are generated by the processor core from which a physical address may be determined via, for example, a TLB (not shown) that maps logical addresses to physical memory pages and assigns therewith a TLB page attribute, such as WB, WC, and UC attribute, to indicate the type of memory being accessed and therefore the protocol that must be followed to access data within the memory page being addressed. The request is then forwarded via the above-mentioned cache agent and cache agent network.

The physical address, including the TLB page attribute, is sent from the cache agent network to a speculative queue 510, from which it is issued in a first-in-first-out (FIFO) order, in one embodiment. The speculative queue, in one embodiment, only contains physical addresses and corresponding TLB page attributes for which a memory attribute has not yet been determined. Physical addresses and their corresponding TLB page attribute from the speculative queue may be issued directly by an arbiter 520, which speculates the memory attribute according to the page attribute and determines the availability of the resources corresponding to the memory attribute. The target of the issued transaction is to an address decoder 525, which returns the actual memory attribute for the physical address, and to a source request in-flight table, such as the missing address file (MAF) 515, which is responsible for, among other things, issuing the physical addresses into the system interconnect according to the proper protocol, such as a coherency protocol for physical addresses targeting coherent memory. In one embodiment, the arbiter may also be responsible for speculatively assigning a memory attribute, such as a non-coherent or coherent attribute, to the physical address based, at least in part, on the corresponding TLB page attribute, such as a WB, WC, or UC attribute, according to a speculation criteria, such as the one described below. In other embodiments, speculation of memory attributes corresponding to each physical address may be made within other portions of the architecture illustrated in FIG. 5, including the speculative queue, the cache agent, the processor core, or some other circuit, software, or combination thereof not shown in FIG. 5.

Regardless of the exact location or implementation (e.g., software or hardware logic), the speculation of memory attributes based on a set TLB page attributes, according to one embodiment, is based on certain decision criteria. Embodiments of the invention include the speculation of memory attributes, regardless of the specific criteria or information from which the speculation is based, such that accesses from cache agents to various target storage areas, including I/O and memory may be processed in advance, without first determining the actual correct memory attribute to which the access corresponds, before being confirmed or cancelled for re-process depending on the correctness of the speculation. In this manner, embodiments of the invention are able to improve the performance of accesses to various storage areas from cache agents in comparison to prior art access architectures, which must first determine the correct memory attribute before issuing the access to the system interconnect or target agent of the access.

Advantageously, an embodiment that uses the speculation criteria summarized in the a table below, in at least one computer system, can improve access performance of the system, because, in the majority of cases, the speculative TLB/memory attribute mappings summarized in the table below are the actual correct TLB/memory attribute mappings. In other embodiments, other TLB/memory attribute mappings may be the actual correct TLB/memory attribute mappings.

In the case that a speculative TLB/memory attribute mapping is not the actual correct mapping, which is relatively rare in at least one embodiment of the invention, embodiments of the invention can use the correct TLB/memory attribute mapping to re-issue the access. For example, in the embodiment illustrated in FIG. 5, the physical addresses and their corresponding TLB page attributes may be, either concurrently or non-concurrently, issued from the speculative queue to an address decoder 525, where the correct memory attribute corresponding to a particular physical address and corresponding TLB attribute is determined. The address decoder may determine the actual memory attributes according to algorithms or table-based techniques known in the prior art.

In the embodiment illustrated in FIG. 5, the correct memory attributes may be both sent to the MAF, such that the architecture of FIG. 5 may function in a manner consistent with the prior art architecture illustrated in FIG. 1, and to a non-speculative queue 530. The non-speculative queue, illustrated in FIG. 5, stores the correct memory attribute and the corresponding physical address corresponding to a mis-speculated access, that is returned to the access architecture of FIG. 5 from a device within the computer system in which the speculated access was sent via mis-speculation path 535. The physical address and the corresponding correct memory attribute are stored together in the non-speculative queue in a FIFO manner, in one embodiment.

The arbiter controls which physical address/attribute pair to send to the address decoder or MAF according to the availability of a set of resources that may be required to carry out the access, such as speculative transaction identification (TID) resources, resources specific to the physical computer system interconnect (e.g., "link" resources, such as buffers), and the availability of the MAF itself. The specific criteria chosen to control the arbiter based off of these or other resources is arbitrary and specific to the needs of a particular embodiment of the invention. Furthermore, the resources associated with the embodiment illustrated in FIG. 5 are only one set of resources that may be considered. In other embodiments, other resources may determine the path of speculated or mis-speculated accesses.

In one embodiment, the protocol agent, mentioned in reference to FIG. 4, may include various logic, including issue logic, and the address decoder and MAF of FIG. 5. In one embodiment using a multi-layered network communication interface between various devices within a computer system, such as those illustrated in FIG. 3, the issue logic may couple requests from cache agents and other messages to a physical link between one device, such as a multi-core processor, to another device within the computer system.

Furthermore, the issue logic may determine resource availability of a request from a cache agent. In one embodiment, the issue logic may determine in advance the availability of resources, such as network buffering resources, which is used to store request information from the protocol agent once the request is processed by the MAF and a coherence message issued onto the computer system network. In one embodiment, the particular buffering resources that should be available depend on the memory attribute corresponding to the request. For example, in one embodiment, coherent requests travel on snoop 540 and home channels 545 of the physical link of the computer system interconnect, whereas non-coherent reads such as to memory mapped IO (MMIO), non-coherent DRAM, and interrupt requests travel on non-coherent (NC) channel 550 of the physical link. In other embodiments where requests are not deleted from a request queue after issue until confirmation of success or failure, advanced resource availability and reservation may not be necessary.

In one embodiment, the issue logic may also determine the availability of target transaction identification (TID) resources. For example, some network communication techniques through which accesses from cache agents may be communicated to other devices within a computer system may pool coherent network traffic according to a set of TIDs. Accordingly, such systems would need to ensure the availability of resources corresponding to coherent requests, and other accesses, of a particular TID. In other embodiments, in which coherent transactions on the computer system network are not pooled, TID resources may not need to be ensured.

In one embodiment, speculation of whether a memory attribute, corresponding to a particular TLB attribute, is coherent or non-coherent is performed prior to or at least concurrently with the determination of the actual memory attribute by the address decoder illustrated in FIG. 5, thereby allowing operations performed by the MAF of FIG. 5 to proceed in parallel with memory attribute calculation in the source address decoder. In addition to determining the correct memory attribute, other functions may proceed in parallel with operations performed by the MAF for a particular access, such as speculative entry allocation to choose an identification code for the request which can be stored in the speculative queue while the corresponding physical address could be stored into the MAF. Conflict detection may also be done in parallel with operations being performed by the MAF for a particular access. Conflict detection may involve checking for whether the request from the cache agent to a physical address, whose memory attributes are being speculatively chosen, is attempting to initiate a new request according to a coherence protocol while another request to the same address is still active in the MAF, in a protocol that does not allow simultaneous active requests to the same address.

In one embodiment, operation code ("opcode") translation and/or other command decoding may be performed in parallel with operations of the MAF corresponding to a particular access. For example, the opcode for the particular access (e.g., "read" command) may be decoded in parallel with the MAF operations for that access. In other embodiments, other functions, such as initialization steps involved in the speculative memory request, may be performed in parallel with MAF operations.

In one embodiment of the invention, speculated memory attributes are assigned to accesses from cache agents issued onto the computer system network, based on the corresponding TLB attribute, according to the following:

| TLB Attribute | Speculated Memory Attribute | Description |
| --- | --- | --- |
| WB | Coherent | Writeback (WB) TLB page attributes typically imply a cacheable memory access, in one embodiment of the invention. The more likely mapping for an access having a WB page attribute is to coherent memory, which uses a coherence protocol. |
| WC | Not Coherent | Write-coalescing (WC) TLB page attributes typically imply an uncached access, in one embodiment of the invention. Such an access may be a memory-mapped I/O (MMIO) access or non-coherent DRAM access via a non-coherent protocol. An example of a WC access is a frame buffer access to non-coherent memory space. However, WC may also be mapped to coherent space for non-temporal writes. |
| UC | Not Coherent | Uncached (UC) TLB page attributes typically imply a configuration-type access and, therefore, not coherent, in one embodiment of the invention. |

In other embodiments, memory attributes, including those not shown above, may be speculatively chosen from TLB page attributes, including others not shown above, according to some other criteria.

After the speculated requests are issued to the computer network, they may be compared with the actual memory attribute calculated by the address decoder. If a mis-speculation occurs, the request may either be recovered and reissued with the correct resources and/or memory attribute, or, if the resource/attribute mapping is illegal according to the computer network protocol, the request may cause a fault or exception. The following is a summary of possible actions taken upon a mis-speculation, according to one embodiment:

| Request Type | TLB Attribute | Actual Memory Attribute | Action |
| --- | --- | --- | --- |
| Read Request | WB | Non-coherent | Request was speculated coherent. Read allocation is rejected. Home and snoop credits are returned. Target coherent TID resource is returned. The request will be reissued as non-coherent using NC credits. |
| Writeback | WB | Non-coherent | Exception occurs. Non-coherent data could be cached in firmware but not written to. A writeback to the non-coherent memory region triggers an error. |
| Read Request | WC/UC | Coherent | Request was speculated non-coherent. Read allocation resources are rejected and NC credit is returned. Additionally, non-coherent population limit |

-continued

| Request Type | TLB Attribute | Actual Memory Attribute | Action |
|---|---|---|---|
| Write Request | WC/UC | Coherent | credit, if any, is returned. The request will be reissued coherent with home, snoop, and TID resources. Write was speculated non-coherent. Write allocation is rejected. Non-coherent population limit credit, if any, is returned. Write credits are returned. Alternatively, in one embodiment, write credits are arbitrated separately, and thus, none is returned. The request will be reissued coherent with home, snoop, and TID resources. |
| Write with Non-temporal hint (NTA) | WB | Non-coherent | Write was speculated coherent, which treats the allocation as a request followed by a merged writeback. Request allocation is rejected. Home and snoop credits are returned. Also, target coherent TID resource is returned. The request will be reissued as a non-coherent write either allocating a write credit, or in one embodiment, leaving network buffer allocation with the write logic. |

Any performance or complexity cost of recovery from memory attribute mis-speculation may be offset, in one embodiment, by a request allocation failure mechanism already used in prior art techniques to react to resource conflicts. Memory attribute speculation techniques, illustrated in embodiments of the invention, also enables an issue event-based MAF design, in which there is only one arbitrated path into the MAF, which is through arbitration events from the issue logic in one embodiment.

For example, in an embodiment in which each cache agent is coupled to a protocol agent, a transaction that has succeeded in acquiring cache lookup resources during arbitration and proceeds to miss in a local (intra-processor) cache will again need to attempt to allocate additional computer system resources, such as coherent or non-coherent link layer credits, to issue a request to the computer system interconnect to obtain the requested data. There may be multiple input paths into one or more arbiters from multiple different stages of a transaction lifetime that correspond to different computer system resources. However, by allowing only one input path into one arbiter from the issue logic, the MAF may be implemented as a single port array with which to perform operations discussed above, instead of updating multiple entries of a table, which requires multiple ports. In such an embodiment, the protocol agent design may be simplified.

Figure 6:
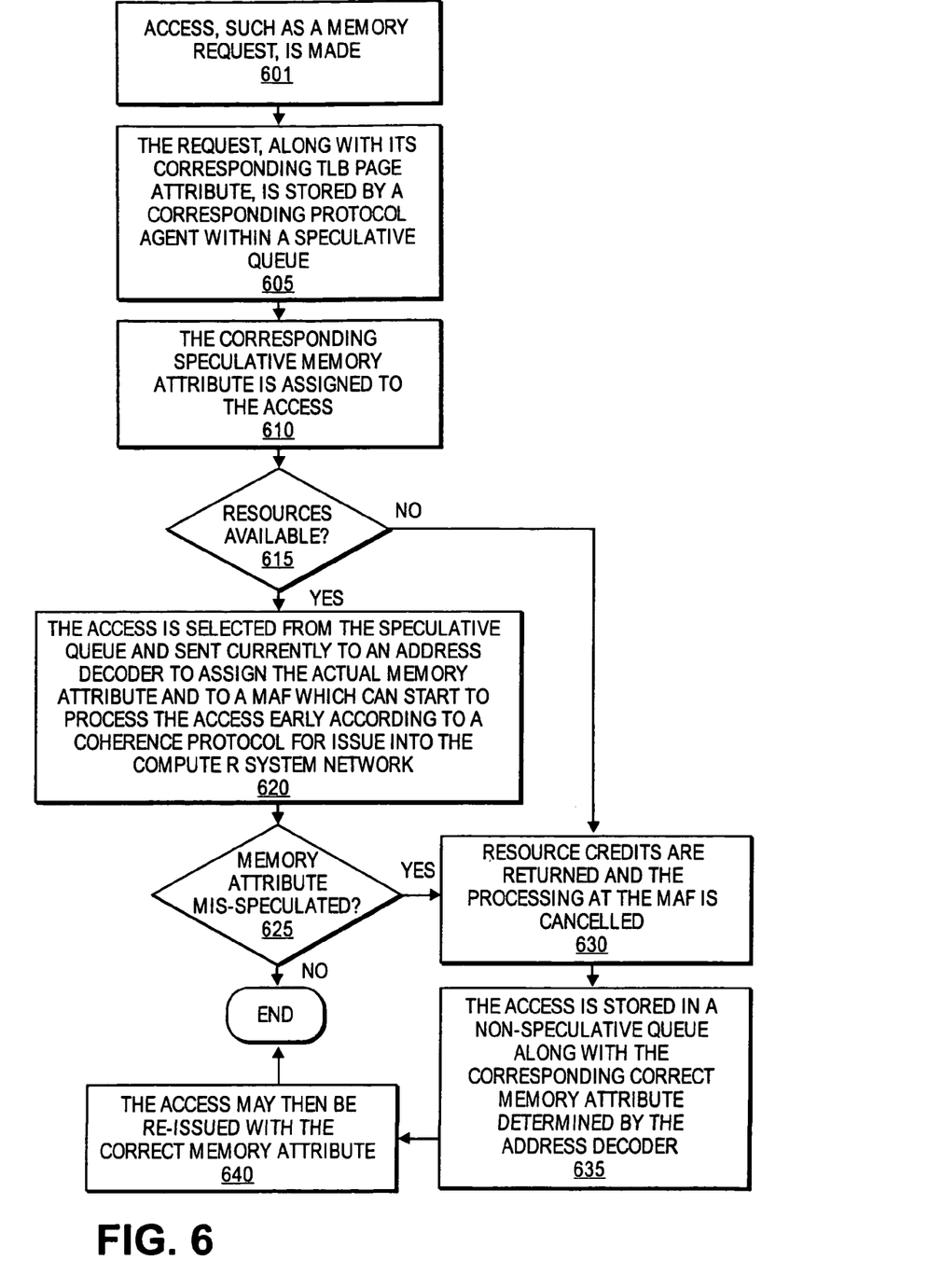
FIG. 6 is a flow diagram illustrating operations that may be used to perform one embodiment of the invention.

FIG. 6 is a flow diagram illustrating operations involved in carrying at least one embodiment of the invention within an architecture, such as the one illustrated in FIG. 5. At operation 601, an access, such as a memory request, is made from a cache agent, and the request, along with its corresponding TLB page attribute, is stored by a corresponding protocol agent within a speculative queue at operation 605. The corresponding speculative memory attribute is assigned to the access at operation 610. Depending upon the availability of resources required by the access at operation 615, the access is selected from the speculative queue and sent concurrently to an address decoder to assign the actual memory attribute and to a MAF which can start to process the access early according to a coherence protocol for issue into the computer system network at operation 620 before the availability of the actual memory attribute. These processing operations for an access include speculative entry allocation to choose an identification code for the request which can be stored in the speculative queue while the corresponding physical address could be stored into the MAF, and conflict detection. If the memory attribute was mis-speculated, at operation 625, then resource credits are returned and the processing at the MAF is cancelled at operation 630. Then, the access is stored in a non-speculative queue along with the corresponding correct memory attribute determined by the address decoder at operation 635. The access may then be re-issued with the correct memory attribute at operation 640.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
a speculation unit to speculatively assign a speculative memory attribute to a first access operation based, at least in part, on a corresponding translation look-ahead buffer (TLB) attribute of the first access operation and according to a speculation criteria and to issue the first access operation to a computer system network without first determining whether the speculative memory attribute is a correct memory attribute, wherein the speculation criteria is based, at least in part, on whether the TLB attribute indicates that the corresponding memory page is a writeback (WB), write combine (WC), or uncached (UC) memory page;
a speculative queue to store a first physical address corresponding to the first access operation until the speculative memory attribute is to be speculatively assigned to the first access operation; and
a non-speculative queue to store the first physical address and a correct memory attribute after determination of the correct memory attribute in an address decoder if the speculative memory attribute is mis-speculated.

2. The apparatus of claim 1 further comprising an arbiter to choose between entries of the speculative queue and the non-speculative queue according to availability of a plurality of resources to be accessed by the first access operation.

3. The apparatus of claim 2 wherein the plurality of resources comprises a speculative transaction identification (TID) resource, a link resource, and a missing address file (MAF) resource.

4. The apparatus of claim 3 wherein the MAF resource is to issue the first access operation to the computer system network in parallel with the address decoder determining the correct memory attribute.

5. The apparatus of claim 1 wherein the TLB attribute is to be set by an operating system (OS) and the correct memory attribute is to be set by firmware.

6. The apparatus of claim 1 wherein the speculative queue is to compare the correct memory attribute with the speculative memory attribute after issuance of the first access operation to determine if a mis-speculation occurred.

7. A system comprising:
a home agent to receive a first request;

a processor coupled to the home agent to generate the first request, wherein the processor comprises a protocol agent coupled to a cache agent, the protocol agent including an arbiter to speculatively assign a speculative memory attribute to the first request according to a speculation criteria and prior to determination of a correct memory attribute for the first request and to issue the first request prior to the determination to an interconnect, a speculative buffer to store an identifier of the first request until the speculative memory attribute is to be assigned to the first request, and a non-speculative buffer to store a mis-speculated request and the corresponding correct memory attribute obtained from an address decoder, wherein the speculation criteria is based, at least in part, on whether a translation lookaside buffer (TLB) attribute indicates that the corresponding memory page is a writeback (WB), write combine (WC), or uncached (UC) memory page.

8. The system of claim 7 further comprising the interconnect to couple the home agent to the processor, the interconnect comprising a plurality of channels, including a snoop channel, a home channel, and a non-coherent channel.

9. The system of claim 8 wherein the mis-speculated request is to be communicated from one or more of the plurality of channels to the protocol agent.

10. The system of claim 9 wherein the speculative memory attribute is dependent upon a plurality of page attributes from the translation lookaside buffer (TLB), and chosen from a group consisting of: a writeback (WB) attribute, a write-combine (WC) attribute, and an uncached (UC) attribute.

11. The system of claim 10 wherein the speculative memory attribute is a coherent attribute or a non-coherent attribute chosen from a group consisting of: non-coherent DRAM, memory mapped IO, IO port, interrupt, and configuration.

12. The system of claim 11 wherein the first request includes a coherent speculative memory attribute if the TLB page attribute to which the first request corresponds is a WB attribute.

13. The system of claim 12 wherein the first request includes a non-coherent speculative memory attribute if the TLB page attribute to which the first request corresponds is a WC or a UC attribute.

14. The system of claim 13 wherein the first request includes the correct speculative memory attribute if resources to be accessed by the first request within the home agent are not available.

15. The system of claim 13 wherein the first request includes the correct speculative memory attribute if the speculative memory attribute was mis-predicted.

16. A processor comprising:
a plurality of processor cores to generate a logical address;
a translation look-aside buffer (TLB) to translate the logical address to a physical address and to assign a page attribute to the physical address;
a protocol agent coupled to a plurality of cache agents to assign a speculative memory attribute to the physical address depending upon the page attribute assigned to the physical address and to assign a correct memory attribute to the physical address if the speculative memory attribute is incorrect, wherein the protocol agent comprises a speculative queue to store the physical address and the page attribute and a non-speculative queue to store the physical address and the correct memory attribute, and is to assign the speculative memory attribute prior to assignment of the correct memory attribute and to issue a first request to a computer system network prior to assignment of the correct memory attribute assignment, wherein the speculation memory attribute is based, at least in part, on whether the page attribute indicates that the corresponding page is a writeback (WB), write combine (WC), or uncached (UC) page.

17. The processor of claim 16 further comprising an arbiter to select between the contents of the speculative queue and the non-speculative queue according to a plurality of resources addressed by the physical address and issue them.

18. The processor of 16 further comprising an address decoder to generate the correct memory attribute and to supply the correct memory attribute to the non-speculative queue.

19. The processor of claim 18 further comprising a missing address file (MAF) coupled to the address decoder to create a protocol command containing the physical address and to send it to a receiving agent according to a coherency protocol.

20. The processor of claim 19 wherein the correct memory attribute is to be determined in parallel with the processing and construction of a message containing the physical address and the speculative memory attribute to the receiving agent.

21. The processor of claim 20 wherein the receiving agent is to return credits corresponding to the plurality of resources if the speculative memory attribute is mis-speculated.

22. The processor of claim 21 wherein the arbiter is to reissue the physical address with the correct memory attribute if the speculative attribute is mis-speculated.

23. A method comprising:
receiving a request from a cache agent;
storing the request with a corresponding translation lookaside buffer (TLB) page attribute within a speculative queue;
assigning a speculative memory attribute to the request prior to determining a correct memory attribute corresponding to the request;
determining the correct memory attribute concurrently with issuing the request along with the speculative memory attribute to a storage area of a computer system network for processing, wherein the speculative memory attribute is based, at least in part, on whether the TLB attribute indicates that the corresponding memory page is a writeback (WB), write combine (WC), or uncached (UC) memory page; and
determining whether the speculative memory attribute was mis-speculated and if so, storing the request in a non-speculative queue along with the corresponding correct memory attribute.

24. The method of claim 23 further comprising re-issuing the request with the correct memory attribute to the computer system network.

25. The method of claim 23 wherein the speculative memory attribute is a coherent memory attribute if the TLB page attribute is a writeback attribute.

26. The method of claim 23 wherein the speculative memory attribute is a non-coherent memory attribute if the TLB page attribute is not a writeback memory attribute.

* * * * *